No. 658,258. Patented Sept. 18, 1900.
R. J. HAGEY.
EXPOSURE SCALE FOR PHOTOGRAPHERS.
(Application filed June 27, 1900.)
(No Model.)

Witnesses:- Louis M. Whitehead. F. E. Bechtold.

Inventor:- Robert J. Hagey. by his Attorneys:- Howson & Howson

UNITED STATES PATENT OFFICE.

ROBERT J. HAGEY, OF PHILADELPHIA, PENNSYLVANIA.

EXPOSURE-SCALE FOR PHOTOGRAPHERS.

SPECIFICATION forming part of Letters Patent No. 658,258, dated September 18, 1900.

Application filed June 27, 1900. Serial No. 21,808. (No model.)

*To all whom it may concern:*

Be it known that I, ROBERT J. HAGEY, a citizen of the United States, residing in Philadelphia, Pennsylvania, have invented a certain Improved Exposure-Scale for Photographers, of which the following is a specification.

The object of my invention is to provide photographers with a simple, cheap, accurate, and easily understood and manipulated device whereby the proper time of exposure of a photographic plate or film of known degree of sensitiveness may be very quickly determined under varying conditions as to subject, character of lens, condition of light, and time of day and year at which the exposure is made.

Figure 1:
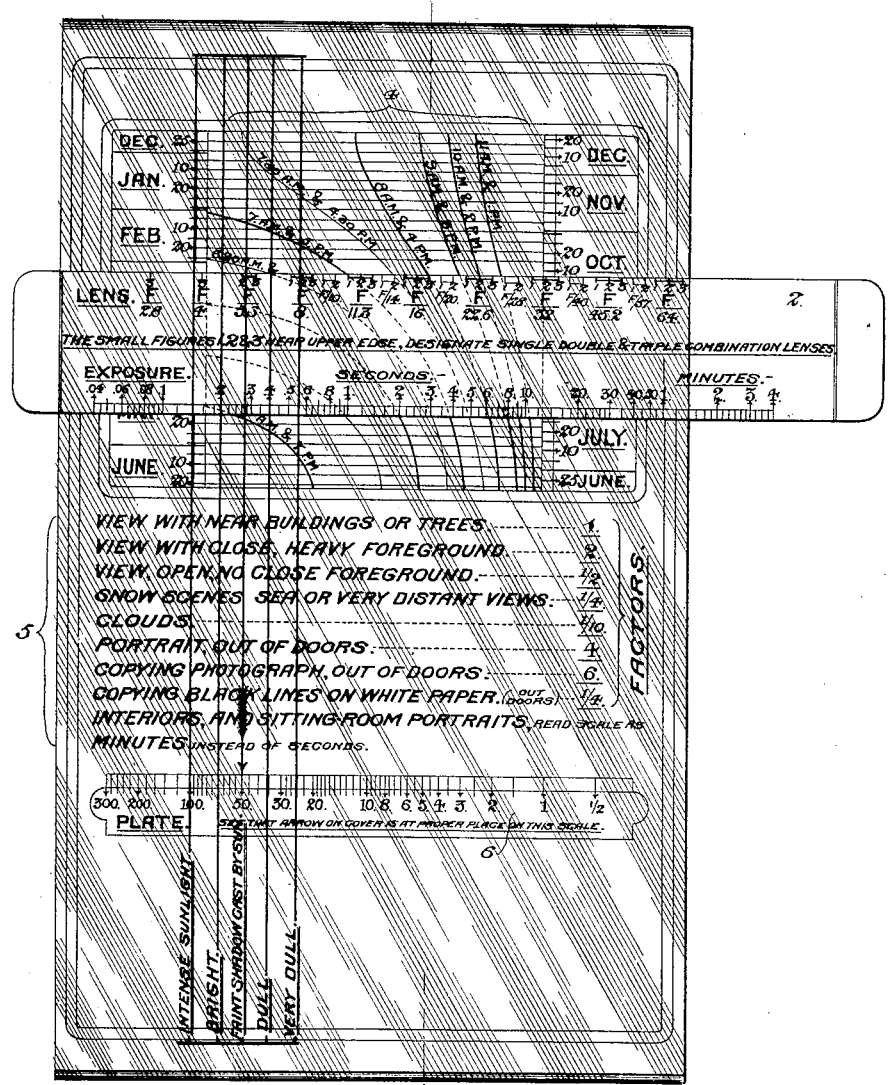
Figure 2:

In the accompanying drawings, Figure 1 is a face view of an exposure-scale constructed in accordance with my invention; and Fig. 2 is a longitudinal section of the same on the line $a\,a$, Fig. 1.

The scale shown in the drawings consists, essentially, of three parts—namely, a rear card 1, a strip 2, adjustable to any desired position upon or across the face of said rear card, and a transparent cover strip or sheet 3, overlying the rear card and the adjustable face-strip. The rear card has a chart comprising opposite columns of dates representing a year and a series of curves 4 representing the mean light value at different hours of the day, these curves bearing a definite relation to the date-columns. The said rear card also has a group of subject-factors 5 and a scale 6 representing the degrees of sensitiveness of plates or films which are likely to be used. The adjustable strip 2 has along one edge a series of indices representing different relations of aperture to focus and different combinations of lenses and on the other edge a graduated exposure-scale, and the transparent cover strip or sheet 3 has a series of parallel lines indicating different conditions of light, these lines being parallel with the graduations of the scale 6 and with those of the exposure-scale of the adjustable strip 2. That one of the lines upon the transparent cover strip or sheet which indicates a normal condition of light preferably serves as a pointer in connection with the graduated scale indicating the sensitiveness of the plate.

In using the device the strip 2 is adjusted in respect to the chart on the card 1 until its upper edge is in line with that graduation of the date-columns indicating the time of year at which the exposure is made. Thus, as shown in the drawings, it is adjusted for an exposure made about the 5th of March or the 7th of October. The strip 2 is then laterally adjusted until the graduation indicating the relation of aperture to focus and the combination of lens employed coincides with the curve indicating the time of day at which the exposure is made, the strip, as shown, being set for the use of a single F 11.3 lens at 7 a. m. or 5 p. m., a triple F 16 lens at 8 a. m. or 4 p. m., or a double F 22.6 lens at 10 a. m. or 2 p. m. When the strip 2 is thus set, the proper time of exposure is indicated by that graduation of the exposure-scale which coincides with the line on the transparent cover strip or sheet indicating the condition of light at the time of exposure. Thus the exposure in intense sunlight would be about one-eighth of a second, in bright sunlight two-tenths of a second, in diffused sunlight a little less than three-tenths of a second, in dull light four-tenths of a second, and in very dull light about eleven-twentieths of a second. This is upon the supposition that the sensitiveness of the plate is represented by the graduation 50 of the scale 6, with which the pointer registers. Lateral adjustment of the cover-sheet 3 or back card 1 in respect one to the other to indicate a plate of less degree of sensitiveness will of course bring the lines on said cover-sheet 3 into such relation to the exposure-scale on the strip 2 as to indicate a longer time of exposure, and, conversely, lateral adjustment of said cover-sheet or back card to indicate a plate of a greater degree of sensitiveness will indicate a correspondingly less time of exposure.

It will be apparent that the use of the group of subject-factors on the card 1 is a matter of convenience rather than necessity, as these factors are not affected by the adjustments provided for, the time of day and year, the character of lens, the sensitiveness of the plate, and the condition of the light being the variable factors, while the subject-factors bear a certain definite relation one to another and are independent of such variable factors.

The scale representing the sensitiveness of plates may also be omitted in some cases—as, for instance, where a plate of known sensitiveness is always used—in which case the lines indicating the character of light will always bear the same lateral relation to the chart containing the curves representing the mean value of the light at the time at which the exposure is made, and in such case these lines may, if desired, be formed directly upon the card containing the said curves.

It will be evident that an exposure-scale constructed in accordance with my invention is of a cheap and simple character, while at the same time it is accurate and covers as wide a range of the variable factors as is likely to be met with in any ordinary practice.

The curves 4 will be calculated and laid out for different latitudes and different climatic conditions; but these variations are not so great in extent as to prevent the use of the same series of curves for a large geographical area.

Having thus described my invention, I claim and desire to secure by Letters Patent—

1. The combination in an exposure-scale for photographers, of a card having thereon a chart containing curves representing mean-light values at different hours on different days of the year, with a strip adjustable laterally and longitudinally in respect to said chart and having a lens-index and an exposure-scale, and a series of lines representing different conditions of light, said lines being so disposed in respect to the chart and adjustable strip, that they will in all positions of adjustment of the latter, coact with the graduations of the exposure-scale to indicate the proper time of exposure, substantially as specified.

2. An exposure-scale for photographers consisting of a card having thereon a chart comprising curves representing the mean-light value at different hours of different days of the year, a strip adjustable in respect to said chart and having a lens-index and an exposure-scale, and a transparent cover having thereon lines indicating different conditions of light, which lines coöperate with the graduations of the exposure-scale to indicate the proper time of exposure, substantially as specified.

3. An exposure-scale for photographers consisting of a card having thereon a chart comprising curves representing the mean-light value at different hours on different days of the year, a strip adjustable in respect to said chart and having a lens-index and an exposure-scale, a scale representing the sensitiveness of different plates or films, said scale occupying a fixed relation to the curves of the chart, and a transparent cover having lines indicating different conditions of light, said cover and the scale of sensitiveness being adjustable in respect to one another.

In testimony whereof I have signed my name to this specification in the presence of two subscribing witnesses.

ROBERT J. HAGEY.

Witnesses:
   F. E. BECHTOLD,
   JOS. H. KLEIN.